(12) United States Patent
Bell et al.

(10) Patent No.: US 10,275,792 B1
(45) Date of Patent: Apr. 30, 2019

(54) REAL-TIME MOBILE COMMUNICATION CONTENT DISTRIBUTION MANIFOLD

(71) Applicant: Sprint Communications Company L.P., Overland Park, KS (US)

(72) Inventors: Timothy L. Bell, Shawnee, KS (US); Wayne W. Schroeder, Blue Springs, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 602 days.

(21) Appl. No.: 14/977,244

(22) Filed: Dec. 21, 2015

(51) Int. Cl.
*G06Q 30/00* (2012.01)
*G06Q 30/02* (2012.01)

(52) U.S. Cl.
CPC ..... *G06Q 30/0255* (2013.01); *G06Q 30/0267* (2013.01); *G06Q 30/0275* (2013.01)

(58) Field of Classification Search
CPC .................................................. G06Q 30/0275
See application file for complete search history.

(56) References Cited

U.S. PATENT DOCUMENTS

2012/0123862 A1  5/2012  Kurra et al.

OTHER PUBLICATIONS

FAIPP Pre-Interview Communication dated Oct. 4, 2017, U.S. Appl. No. 14/619,689, filed Feb. 11, 2015.
Office Action dated Dec. 4, 2017, U.S. Appl. No. 14/619,689, filed Feb. 11, 2015.
Final Office Action dated Mar. 12, 2018, U.S. Appl. No. 14/619,689, filed Feb. 11, 2015.
Office Action dated Jun. 28, 2018, U.S. Appl. No. 14/619,689, filed Feb. 11, 2015.
Final Office Action dated Nov. 8, 2018, U.S. Appl. No. 14/619,689, filed Feb. 11, 2015.

*Primary Examiner* — Meredith A Long

(57) ABSTRACT

A content presentation bid application server comprising a processor, a non-transitory memory, and a content presentation bid application stored in the non-transitory memory. When executed by the processor the application receives a content presentation bid request, wherein the content presentation bid request comprises an identity of a user equipment (UE), retrieves enrichment data associated with the UE from a database, transmits the content presentation bid request accompanied by the enrichment data to demand side platforms, and receives content presentation bid responses from the demand side platforms. The application further selects one of the content presentation bid responses received from the demand side platforms, builds a content presentation bid based on the selected content presentation bid response, and transmits the content presentation bid.

20 Claims, 5 Drawing Sheets

US 10,275,792 B1

REAL-TIME MOBILE COMMUNICATION CONTENT DISTRIBUTION MANIFOLD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are very commonly used and have become an electronic platform for delivering a wide variety of information content including reportage, entertainment content, and advertisement content. In some cases, content web sites offer free content to electronic communication devices at no cost and recover their operating costs and a profit by stitching advertising content in with content delivered responsive to user requests. Advertisement suppliers may bid to have their advertisement presented on an electronic device along with specifically requested content, for example in a head-of-page location, in a side-margin location, or in a bottom-of-page location relative to the specifically requested content.

SUMMARY

In an embodiment, a system is disclosed. The system comprises a load balancer server comprising a load balancer processor, a load balancer non-transitory memory, and a load balancer application stored in the non-transitory memory. When it is executed by the load balancer processor, the load balancer application receives content presentation bid requests and transmits each content presentation bid request to one of a plurality of application servers to balance a bid request load across the application servers, wherein the bid requests are requests to bid a price for presenting content on a user equipment (UE) associated with the bid request and comprises an identity of the UE. The system further comprises a plurality of content presentation bid application servers. Each content presentation bid application server comprises a content presentation bid processor, a content presentation bid non-transitory memory, and a content presentation bid application stored in the content presentation bid non-transitory memory. When executed by the content presentation bid processor, the content presentation bid application determines a content presentation bid application server bid query rate for each of a plurality of demand side platforms based on a predefined total bid query rate for each demand side platform and based on a predefined number of content presentation bid application servers that are active, receives content presentation bid requests from the load balancer server, and looks up enrichment data stored in a data store based on the UE identity in the content presentation bid requests. The content presentation bid application further transmits content presentation bid requests supplemented with enrichment data to the demand side platforms based at least in part on the content presentation bid application server bid query rate determined by the content presentation bid application, receives one or more content presentation bid responses from the demand side platforms, and selects a content presentation bid response from among the one or more content presentation bids responses. Based on the selected content presentation bid response, the content presentation bid application further builds a content presentation bid and transmits the content presentation bid.

In another embodiment, a content presentation bid application server is disclosed. The content presentation bid application server comprises a processor, a non-transitory memory, and a content presentation bid application stored in the non-transitory memory. When executed by the processor, the content presentation bid application receives a content presentation bid request, wherein the content presentation bid request comprises an identity of a user equipment (UE), retrieves enrichment data associated with the UE from a database, where the enrichment data comprises two or more of demographics about a user associated with the UE, information about the most recent time an application was launched on the UE, information about a recent relocation by more than 200 miles by the UE, identification of a cluster to which a user of the UE is associated, information about an average rate of data consumption by the UE, and information about an average volume of on-line purchases made from the UE, and determines a bid request response timeout based on a history of content presentation bid cycles completed by the content presentation bid application. The content presentation bid application further transmits the content presentation bid request accompanied by the enrichment data to one or more demand side platforms, wherein the demand side platforms are content providers that bid to pay to have content presented on the UE, receives one or more content presentation bid responses from the demand side platforms, and determines that the time between the receipt of the content presentation bid request by the content presentation bid application to the present time has reached the bid request response timeout. Responsive to determining that the present time has reached the bid request response timeout, the content presentation bid application further selects one of the content presentation bid responses received from the demand side platforms, based on the selected content presentation bid response builds a content presentation bid, and transmits the content presentation bid.

In an embodiment, a method for mobile content distribution is disclosed. The method comprises receiving a content presentation bid request by a content presentation bid application server from one of a plurality of content exchanges, where each content exchange provides content dynamically to user equipments (UEs) and the content presentation bid request comprises an identity of a UE and an identity of the content exchange and determining a response time by the content presentation bid application server based on the identity of the content exchange and a history of content presentation bid cycles completed by the content presentation bid application server with the identified content exchange, where the response time is a time between receiving the content presentation bid request and a time when the content presentation bid application server returns a response to the content presentation bid request to the identified content exchange. The method further comprises retrieving enrichment data associated with the UE from a database by the content presentation bid application server, where the enrichment data comprises two or more of demographics about a user associated with the UE, information about the most recent time an application was launched on the UE, information about a recent relocation by more than 200 miles by the UE, identification of a cluster to which a user of the UE is associated, information about an average rate of data consumption by the UE, and information about an average volume of on-line purchases made from the UE. The method further comprises transmitting the content presentation bid request and the enrichment data by the content presentation bid application server to a plurality of demand side platforms, where the demand side platforms are content providers that bid to pay to have content presented on the UE, determining a bid request response timeout by the content presentation bid application server based on the response time, based on a time consumed in retrieving the enrichment data, and based on an average time consumed by bid selection by the content presentation bid application server, and receiving one or more content presentation bid responses by the content presentation bid application server from the demand side platforms. The method further comprises determining by the content presentation bid application server that the time between the receipt of the content presentation bid request from the content exchange by the content presentation bid application server to the present time has reached the bid request response timeout, responsive to determining that the present time has reached the bid request response timeout, selecting by the content presentation bid application server one of the content presentation bid responses received from the demand side platforms, building by the content presentation bid application server a content presentation bid based on the selected content presentation bid response, and transmitting the selected content presentation bid by the content presentation bid application server to the content exchange.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
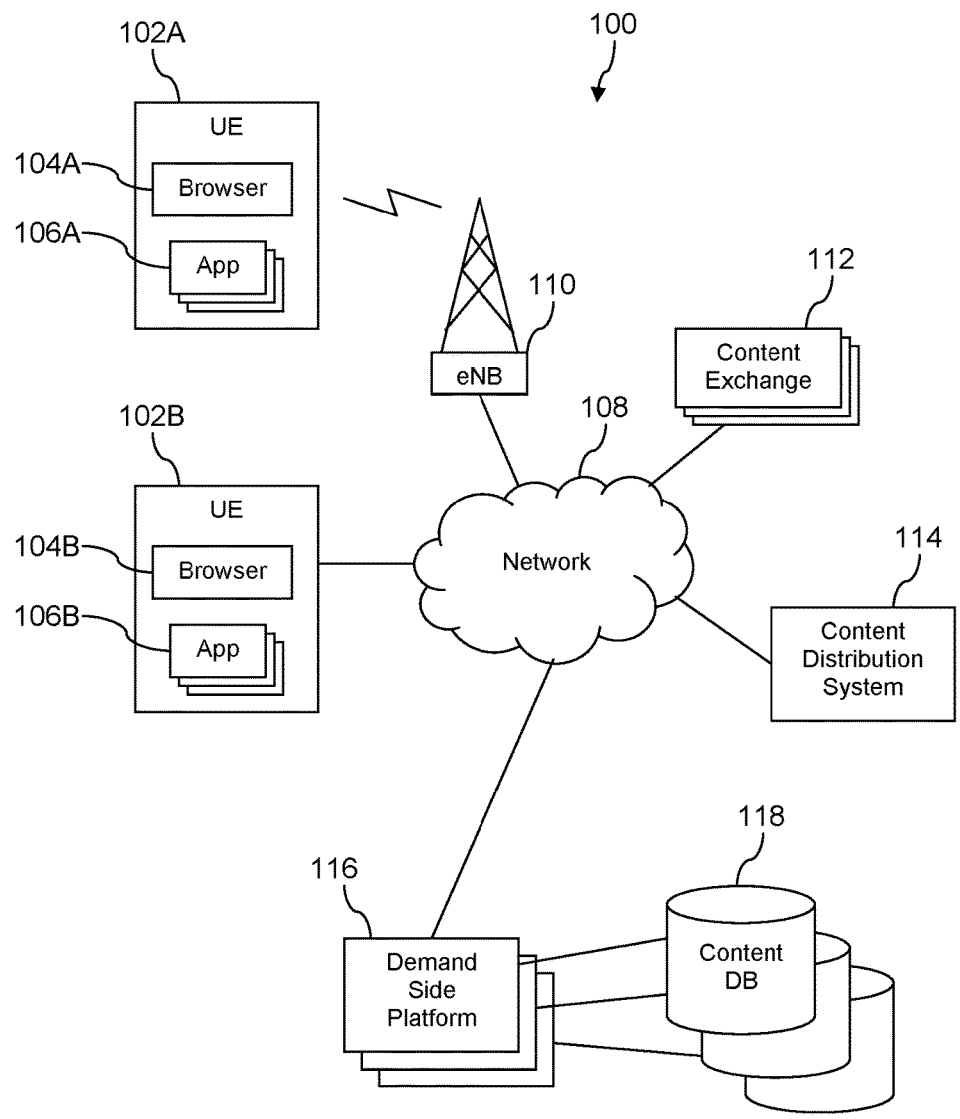
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a content distribution system which may also be referred to as a content distribution manifold in some contexts. User equipment (UEs) such as smart phones may be used to access content from various sources. When content requested by a user (i.e., primary content) is presented on a display of the UE it may be desirable to present ancillary content proximate to the primary content, located above the primary content, located along either the left or right margin of the primary content, or located below the primary content. A content exchange may request bids from ancillary content providers for presenting their ancillary content in the display of the UE. Said in other words, the content exchange may sell an opportunity to place ancillary content in a display of a UE to a highest bidder. The request for content presentation bid requests may include an identity of the UE, an identity of the content exchange, and optionally information about the UE or a user of the UE. For example, the bid request may indicate what kind of data communication link the UE has.

Because the opportunity to present ancillary content on the UE may be short lived, demand side platforms (i.e., providers of ancillary content) may be expected to submit their content presentation bids to the content exchange in less than 500 mS. In an embodiment, the demand side platforms may be expected to submit their bids in less than about 200 mS, less than about 150 mS, less than about 100 mS, or less than about 50 mS. Because of this short response time and because many thousands of such opportunities may occur per second, the content presentation bidding process is performed by computer systems. It is obvious that a human being cannot provide responses to content presentation bid requests within 500 mS and particularly not when this is performed hundreds of times per second, thousands of times per second, tens of thousands of times per second, or even more frequently.

The content distribution system taught by the present disclosure intermediates between one or more content exchanges and a plurality of demand side platforms. The content distribution system receives the content presentation bid request, looks up enrichment data based on an identity of the UE in an enrichment database, and sends the content presentation bid request along with the enrichment data to the demand side platforms. The demand side platforms are thereby enabled to evaluate the desirability to them of bidding—and further how much money to bid—to present their ancillary content on the UE based on the enriched data and optionally on at least some of the data provided in the content presentation bid request. The enriched data may comprise two or more demographics about a user associated with the UE, information about the most recent time an application was launched on the UE, information about a recent relocation by more than 200 miles by the UE, identification of a cluster to which a user of the UE is associated, information about an average rate of data consumption by the UE, and information about an average volume of on-line purchases made from the UE. The enriched data promotes the demand side platforms better evaluating the receptivity of the user of the UE to the ancillary content and thus evaluating the value to the demand side platform of winning the bid and presenting that ancillary content on the particular user's UE.

Providing the value added enrichment data to the content presentation bid process creates some inherent computer processing challenges. The intermediation adds a lag in the turn-around of the bidding process, and the bidding process is very quick and short in duration (e.g., less than 500 mS). Further, the intermediation is not a mere pass-through or mere relaying of communication. The intermediation entails performing a search of the enrichment data store and further selecting among a plurality of bid responses from demand side platforms. How long should the content distribution system wait before completing a selection? The timeout period associated with each content exchange, which may be different for each different content exchange, may be determined over a number of bid response cycles. A bid request response timeout may be determined based on a history of content presentation bid cycles completed by the content distribution system and/or by content presentation bid application servers that are part of the content distribution system. Said in other words, the content distribution system may be able to calculate a probability distribution of what response delay results in a lost bid. As an example, the content distribution system may set a timeout threshold for a given content exchange that is associated with less than a 20% chance of bid rejection due to excessive time delay, less than a 10% chance of bid rejection, or some other threshold. The content distribution system will monetize the value add of the enrichment data that it contributes to the bidding process by bidding less for the content presentation opportunity than the bid price of the selected bid (the difference being the rent on the enrichment data value add), but the content distribution system must calculate how much to bid, for example based on a determination of a probability distribution of bid price associated with a winning bid.

It is contemplated that the determination of timeout values and the determination of content exchange winning bid prices will be performed on an on-going basis. A history of winning bid prices may be maintained for each different content exchange, and statistical analysis may be performed on the data to determine bid prices for different days and/or different time of days. Additionally, a current window average of winning content presentation bid prices over the most recent time window may be maintained and used to determine how much to bid. In an embodiment, the presentation content comprises advertisements. The bid request may further identify the presentation content opportunity as one of a video content opportunity, an animation content opportunity, or a static image content opportunity.

To support the quick response time demanded by the content exchanges, the present disclosure teaches a specific computer system structure or information technology (IT) solution that can support the rapid responses desired as well as support convenient scaling to support greater flow through of ancillary content. Having said this, it is understood that the teachings of the present disclosure may advantageously be applied to other computer system structures and other IT solutions. In an embodiment, the content distribution system comprises one or more load balancer server that registers with and receives content bid requests from one or more content exchanges. The one or more load balancer server distributes these content bid requests, in a load balancing process, to a plurality of content presentation bid application servers (hereafter "bid server" in the interests of conciseness). Each bid server performs enrichment on the content presentation bid requests (hereafter "bid requests") and forwards the bid requests and associated enrichment data on to demand side platforms (DSPs).

Each DSP may specify in advance a desired number of queries per second (QPS) rate at which it wants to receive bid requests. Additionally, each DSP may provide criteria for kinds of bid requests it wishes to receive. For example, the criteria may identify demographic characteristics, user freshness (i.e., how recently the UE has launched a specified application, how recently has the UE been relocated a significant distance), and other information available through enrichment. Each bid server is configured with the QPS rate and criteria provided by each DSP and a number of active bid servers. Each bid server, operating independently and without coordination with the other bid servers, limits the rate of bid requests that it sends to each DSP based on a pro rata amount of the defined QPS rate and the number of bid servers. Thus, when a DSP desires to receive bid requests at a 10,000 QPS rate and when 10 bid servers are active, a given bid server will try to feed bid requests to the subject DSP at a maximum of (10,000/10) QPS rate, and without coordinating this with its fellow bid servers. The avoidance of coordination among bid servers may promote faster response time for the bid servers. To achieve fast response, the ad servers maintain event-driven I/O "keep-alive" communication links with the DSPs.

In an embodiment the content distribution system described herein is advantageously deployed by a wireless communication service provider or in collaboration with a wireless communication service provider. A wireless communication service provider may have access to enrichment data by virtue of providing wireless communication services to users of the UEs and by virtue of providing network supported services to applications that execute on the UEs.

Turning now to FIG. 1, a communication system 100 is described. In an embodiment, system 100 comprises a first user equipment (UE) 102A comprising a browser 104A and a plurality of applications 106A. The system also comprises a second user equipment (UE) 102B comprising a browser 104B and a plurality of applications 106B the second UE may communicate directly with network 108. The first UE 102A communicates with a network 108 via an enhanced node B (eNB) 110, a base transceiver station (BTS), or a cell tower. The system further comprises one or more content exchange servers 112, a content distribution system 114, a plurality of demand side platforms (DSPs) 116 associated with a plurality of content data stores 118. The content exchange servers 112 and the demand side platforms 116 may be implemented as computer systems. Computer systems are described further hereinafter.

The eNB 110 provides a wireless communication link to the first UE 102A according to one or more of a long term evolution (LTE), a code division multiple access (CDMA), a global system for mobile communications (GSM), or a worldwide interoperability for microwave access (WiMAX) wireless communication protocol. Through the eNB 108, the first UE 102A is communicatively coupled to the network 108. The first UE 102A may also be provided a wireless communication link from a Wi-Fi access point, a Bluetooth® access point, or another short range radio that couples the first UE 102A to the network 108. The system 100 may also comprise a second UE 102B that is communicatively coupled to the network 108 by a wired communication link. The system 100 may comprise any number of UEs 102, eNBs 110, content exchange servers 112, DSPs 116, and content data stores 118. The network 108 may comprise one or more public networks, one or more private networks, and/or a combination thereof. The UE 102 may comprise mobile telecommunication devices, smart phones, personal digital assistants (PDAs), media players, wearable computers, headset computers, laptop computers, notebook computers, tablet computers, or desktop computers.

In an exemplary scenario, a user of the first UE 102A opens his browser 104A and clicks on a link to see content presented on a display of the UE 102A. The viewer hopes that the request's content displays promptly, possibly in a second or less, on his display so he can begin reading or looking at the content. The browser 104A sends an HTTP request for the linked content to a content server (not shown). This HTTP request may be relayed by or observed by the content exchange server 112 and discerned as an opportunity to present ancillary content in the display of the UE 102A. Alternatively, another network node, such as a media gateway, may notify the content exchange server 112 of the opportunity to present ancillary content in the display of the UE 102A.

The content exchange server 112 may send a content presentation bid request out to a plurality of registered bidders, including the content distribution system 114. The content distribution system 114 may look up enrichment data and send the bid request along with the enrichment data to one or more DSPs 116. The one or more DSPs 116 may determine to bid or not bid for presenting content (e.g., ancillary content) in the display of the UE 102A and may return a bid response comprising a bid price along with the actual presentation content to the content distribution system 114. The content distribution system 114 may select one of the bid responses and build a final bid response based on the DSP bid response. The content distribution system 114 sends the final bid response to the content exchange server 112. The content exchange server 112 may receive other bid responses from other bidders in addition to the content distribution system 114. In an example, the content exchange server 112 may select the final bid response of the content distribution system 114, possibly because it is the highest price bid that is received timely. The content exchange 112 forwards the content associated with the winning bid to the browser 104A, and the browser 104A presents the content in the display of the UE 102A, for example in a right-hand margin of the display. The content exchange 112 may be said to provide content (e.g., ancillary content) dynamically to the UE 102.

Figure 2:
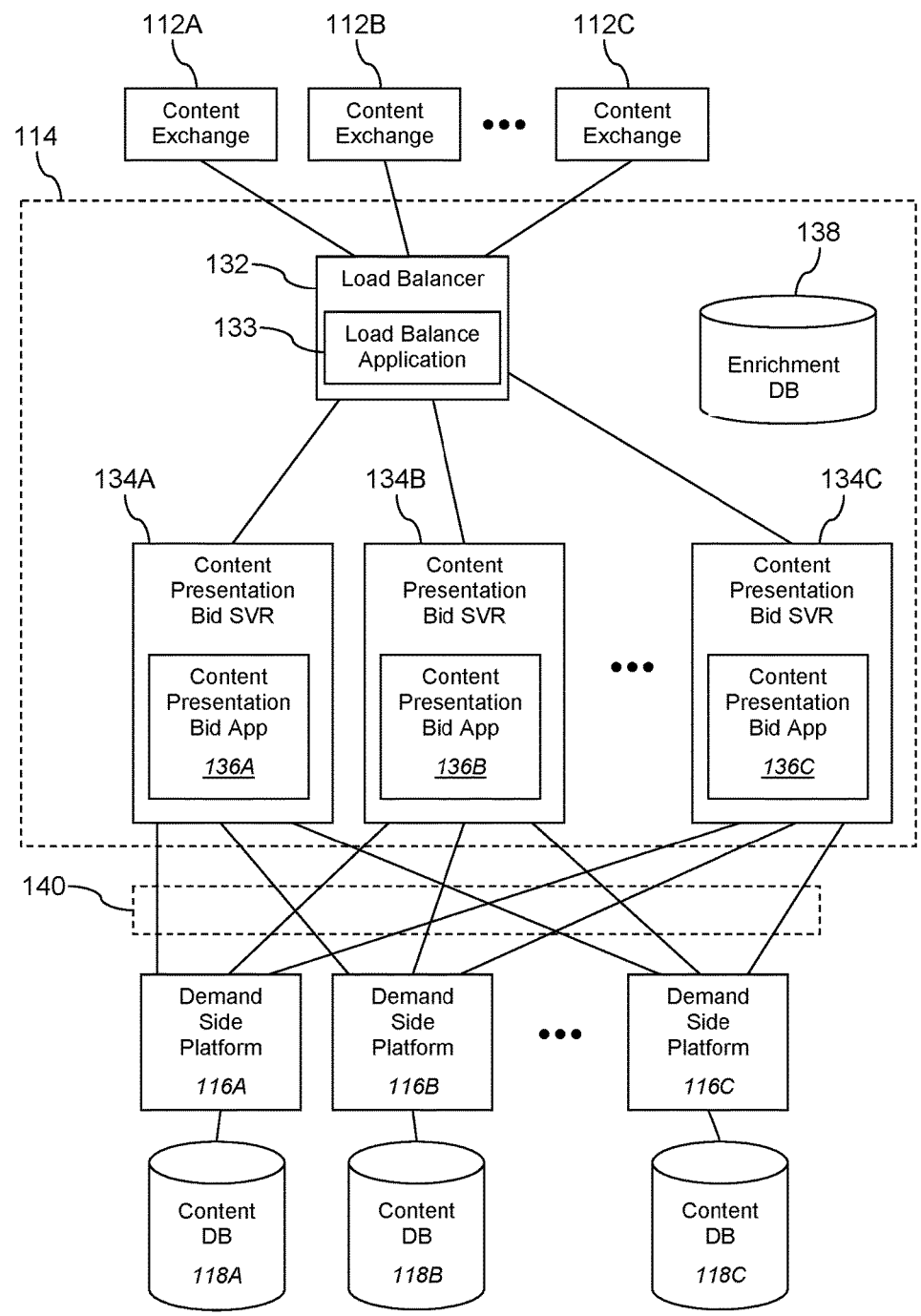
FIG. 2 is a block diagram showing further details of the communication system of FIG. 1 according to an embodiment of the disclosure.

Turning now to FIG. 2, further details of the content distribution system 114 are described. In an embodiment, the content distribution system 114 may comprise a load balancer server 132 that executes a load balance application 133, a plurality of content presentation bid servers 134, illustrated in FIG. 2 as content presentation bid servers 134A, 1346, . . . , 134C, each executing a content presentation bid application 136, respectively illustrated in FIG. 2 as content presentation bid applications 136A, 1366, . . . , 136C, and an enrichment data store 138. The load balancer server 132 and the content presentation bid servers 134 may be implemented as computers systems. The load balancer server 132 may be registered to receive content presentation bid requests from and to place content presentation bids with any number of content exchange servers 112, illustrated in FIG. 2 as content servers 112A, 112B, . . . 112 C. The load balance application 133 passes each bid request on to one of the bid servers 134 to distribute the bid request load received from the content exchange servers 112. Final bids may be provided by the bid servers 134 to the load balance application 133 which in turn transmits the final bid to the appropriate content exchange server 112. Alternatively, the bid server 134 may send the final bid directly to the appropriate content exchange server 112, bypassing the load balancer server 132 and/or the load balance application 133 and reducing its processing load.

When it receives a bid request from the load balancer server 132, the bid server 134 starts a count-down timer for waiting on receipt of bid responses from DSPs 116. The count-down timer may initially be set to a bid request response timeout value determined by the bid server 134. At about the same time, the bid server 134 sends a search request to the enrichment data store 138 to obtain enrichment data about the UE 102 and/or a user associated with the UE 102. The bid request sent by the content exchange server 112 may comprise one or more identifiers or other pieces of information that the bid server 134 may employ to locate enrichment data. These identifiers or information may comprise a phone number, a mobile equipment identity (MEID), an application identity, a Google ad identity, an iOS ad identity, or other information. Enrichment data may be looked up using these identifiers or information. Enrichment data may comprise a wide variety of information that may or may not be of use to a DSP 116 in evaluating the desirability of bidding to present content on the display of the UE 102 and additionally what price to bid. For example, the DSP 116 may have an advertisement targeted to a specific kind of user. If the enrichment data implies that the user of the UE 102 is this specific kind of user, the DSP 116 may not only place a bid but bid a relatively high price for the opportunity to present the advertisement on the display of the UE 102, in hopes of beating other competing bids.

The enrichment data may comprise a wide variety of information. In an embodiment, enrichment data may comprise any one of demographics about a user associated with the UE, information about the most recent time an application was launched on the UE, information about a recent relocation by more than a predefined distance by the UE (e.g., a relocation of more than 100 miles, a relocation of more than 200 miles, a relocation of more than 300 miles, or some other threshold distance), identification of a cluster to which a user of the UE is associated, information about an average rate of data consumption by the UE, and information about an average volume of on-line purchases made from the UE. In an embodiment, enrichment data may comprise two or more of the types of data identified above. Demographics data may comprise, but not be limited to, sex, age, educational level, ethnicity, income level, marital status, number of children, residential zip-code, and the like.

Enrichment data such as the most recent time an application was launched on the UE 102 can provide clues to a user's relative receptivity to ancillary content. The bid request may comprise the identity of the application that initiated the primary content request associated with the bid request for ancillary content for presentation. There is a known phenomenon of a user being saturated with media messages to a point that he experiences a form of quasi-blindness to the subject media messages. A DSP 116 may be willing to bid or bid more for the opportunity to present his ancillary content in the display of a user that can be expected to not be experiencing this quasi-blindness, based on the fact that he has not opened his browser 104 on his UE 102 for four days. The information about when an application was most recently launched can be aggregated across all applications or the information may distinguish between each application. Said in another way, the information may simply indicate a length of time since any application was last opened or may indicate a length of time since a particular application (e.g., the application that now has an opportunity for presentation of ancillary content) was last opened. In an embodiment, a client application on the UE 102 may collect usage history information on the browser 104 and applications 106 and periodically report this history to the enrichment data store 138 and/or to a server (not shown) that manages and processes user information. Alternatively, the application 106 may comprise a history collecting component that logs the launching of the application 106 and periodically reports the log back to the enrichment data store 138.

Enrichment data that indicates that the UE 102 has been relocated by more than a threshold distance may be useful for identifying when the user associated with the UE 102 is engaged in travel. When traveling, the user may have an interest in different kinds of ancillary content, for example advertisements for Italian restaurants or about the nearest premium coffee shop. It is contemplated that different distance thresholds might be effective in drawing the inference that the user is traveling. In an embodiment, the threshold may be at least 50 miles, at least 100 miles, at least 200 miles, at least 300 miles, or some other distance. In an embodiment, the threshold may be different for each different UE 102. For example, a distribution of relocations from the residence of the user of the UE 102 (e.g., a subscriber of a wireless communication service) may be logged and analyzed to determine a relocation distance that is statistically likely to indicate the user is traveling.

Enrichment data about how much data a user of a UE 102 receives may be useful in identifying a type of user or a user category. The usage data may be useful in inferring how likely the user is to be attentive to presented ancillary content. The enrichment data about on-line purchases can be useful in evaluating the receptivity of the user to advertisements.

Enrichment data may include an identity of a cluster to which the UE 102 and/or the user of the UE 102 has been associated with. Clustering may be performed abstractly to cluster UEs or users into a predefined number of clusters according to a number of individual characteristics or properties associated with the users and/or UEs. If it can be established that individuals included in a given cluster behave similarly and respond similarly to ancillary content and more specifically respond favorably to the particular ancillary content a given DSP 116 desires to present, the DSP 116 may bid a high price for the opportunity to present that ancillary content on the display of the UE 102. For further details on clustering, see U.S. patent application Ser. No. 14/619,689, filed Feb. 11, 2015, entitled "System and Method for Subscriber Cluster Synthesis," by Piero D. Ferrante which is incorporated by reference herein in its entirety.

The bid server 134 sends the bid request and any associated enrichment data to one or more of the DSPs 116. It is to be noted that the bid request may itself comprise user data or data about the UE 102, for example a model of the UE 102. This information may also be useful to DSPs 116 in evaluating the importance to them of bidding for the opportunity to present content on the UE 102. In an embodiment, the content presentation bid application 136 may capture such data embedded in the bid request and store this, indexed by the UE 102 and/or the user of the UE 102 in the enrichment data store 138, to the extent that this is permitted by any agreements in place with the subject content exchange 112.

The bid servers 134 establish and maintain event driven I/O "keep-alive" communication links 140 with the DSPs 116. The communication links 140 may also be referred to as persistent event driven I/O communication links. In a preferred embodiment, each active bid server 134 establishes and maintains a keep-alive communication link with every registered DSP 116. Thus, a first bid server 134A establishes and maintains a first keep-alive communication link with a first DSP 116A, a second keep-alive communication link with a second DSP 116B, and a third keep-alive communication link with a third DSP 116C. While three bid servers 134 and three DSPs 116, each of which is coupled to a content database 118A, 118B, or 118C, respectively, are illustrated in FIG. 2, it is understood that there may be any number of bid servers 134 and any number of DSPs 116. In an embodiment, an asynchronous HTTP client maintains an outbound pool of connections or reuse connections for communicating with the DSPs 116. As used here, the term "connection" is used as a term of art of data communications and does not imply a direct physical connection, much as a TCP connection between two hosts does not imply a direct physical connection. The keep-alive communication links use asynchronous HTTP requests that do not block.

Each of the bid servers 134 operates independently of the other bid servers 134. In some contexts, these bid servers 134 may be referred to as disjointed, non-clustered servers. Each active bid server 134 may be configured with filter criteria and queries per second bid request rate associated with the DSPs 116. The filter criteria and QPS rates may be updated to the bid servers 134 as desired. Each bid server 134 may determine a pro rata QPS for each DSP 116 based on the total QPS rate requested by the DSP 116 and the number of active bid servers 134. For example, the pro rata QPS for a DSP 116 that has indicated it would like to receive about 5,000 QPS when 6 bid servers 134 are active would be (5,000/6) or about 833 bid requests per second from one of the bid servers 134. The DSPs 116 may specify criteria that describe the kind of opportunities to present content on the UEs 102 that they would like to be notified about. For example, the criteria may define a range of demographic characteristics that are of interest.

Each bid server 134 attempts to provide each DSP 116 with about the pro rata QPS of bid requests and further to restrict those bid requests to those which match the filter criteria of the DSPs 116. The bid servers 134 may suppress and not forward some bid requests received from the load balance application 133 to throttle the QPS sent to a DSP 116. Additionally, the bid servers 134 may suppress and not forward some bid requests received from the load balance application 133 to filter the flow-through of bid requests to those that meet the criteria established by the DSP 116. In an embodiment, the bid servers 134 may modulate the pro rata QPS fed to the DSPs 116, increasing in a later time period when the pro rata QPS has been undershot in an earlier time period and decreasing in a subsequent time period when the pro rata QPS overshot in the previous time period. In an embodiment, the pro rata QPS may be treated as a "not to exceed" service level agreement (SLA) and under no circumstance overshoot this pro rata QPS.

The bid server 134 may determine a time (e.g., a timeout value) within which a final bid response should be returned to the content exchange servers 112 to avoid losing a bid due to untimeliness. This time may be expected to vary between different content exchange servers 112 and may even vary, over time, for the same content exchange server 112. The bid server 136 may determine a timeout period for each exchange server 112 that represents a time that it can wait before starting bid finalization. It is understood that this timeout period may be based on a number of different considerations such as how long it takes the bid server 134 to obtain enrichment data, how long it takes the bid server 134 to perform calculations to select a bid from multiple bid responses from DSPs 116, how long it takes to produce the final bid based on the selected bid, and how long it takes the final bid to transit the network 108 to the exchange server 112. When the timeout period expires, the bid server 134 may begin selecting a bid response from among the bid responses received from the DSPs, even if responses have not been received from all DSPs. The selection among received responses may be based on the highest price of the bid responses, but it may also be based on other considerations. For example, if a bid response from a DSP 116 is not the highest bid but close to the highest bid and if the DSP 116 is behind on fulfillment of its desired pro rata QPS for the subject bid server 134, the DSP 116 may still be selected for incorporating into the final bid response.

In building its final bid response, the bid server 134 considers the price bid by the selected bid response and the expected winning bid price it has calculated for the content exchange server 112 that sent out the associated bid request. If the expected winning bid price is more than the price bid by the selected bid response, the bid server 134 may choose to not bid. Generally, the bid server 134 will submit a final bid to the content exchange server 112 that is less than the bid offered by the selected bid response, with the intention of banking the difference between the bids as compensation or rent for the value add of its enrichment data. In an embodiment, the bid servers 134 may share data about winning bids at the content exchange servers 112.

In an embodiment, the bid servers 134 may also send bid requests to other systems that are not DSPs 116. For example, a wireless communication service provider may operate a content presentation campaign platform through which it sells content presentation opportunities to customers or clients. The bid servers 134 may select from among bid responses provided by DSPs 116 as well as from the content presentation campaign platform. In an embodiment, the content presentation campaign platform may be used to provide higher value bids than are being received from the DSPs 116.

Figure 3A:
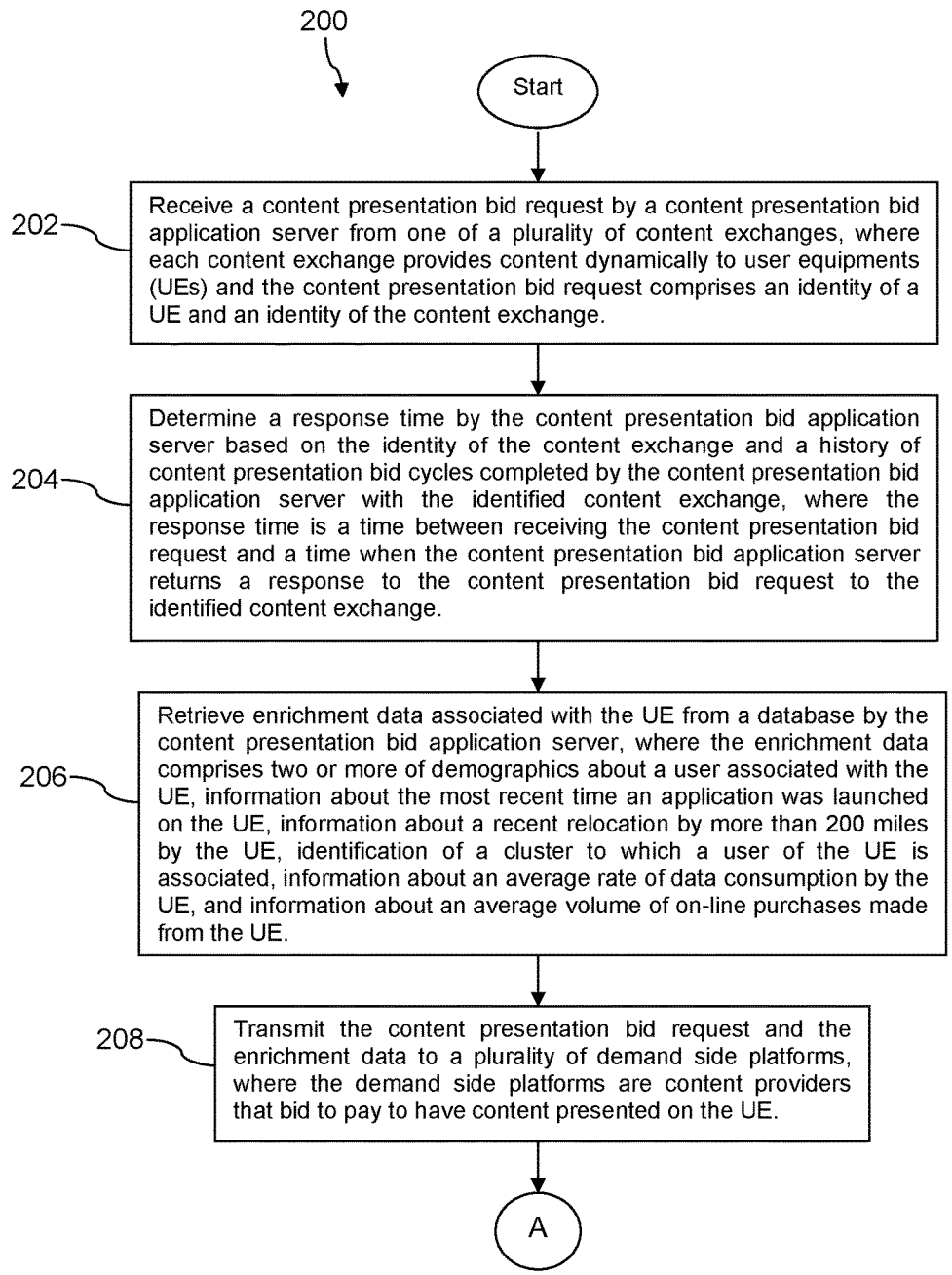
FIG. 3A and FIG. 3B is a flow chart of a method according to an embodiment of the disclosure.
Figure 3B:
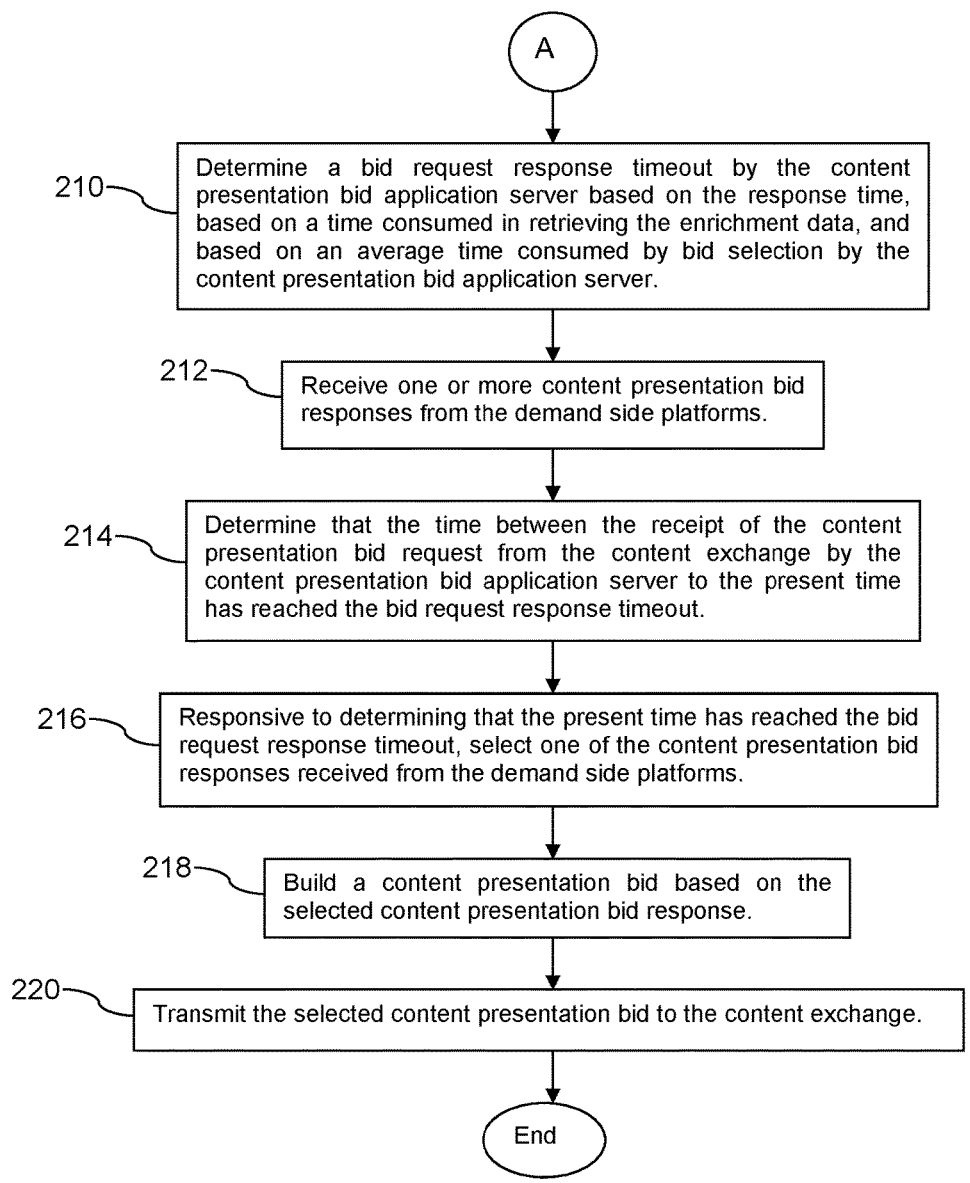

Turning now to FIG. 3A and FIG. 3B, a method 200 is described. At block 202, a content presentation bid application server receives a content presentation bid request from one of a plurality of content exchanges, where each content exchange provides content dynamically to user equipments (UEs) and the content presentation bid request comprises an identity of a UE and an identity of the content exchange. At block 204, the content presentation bid application server determines a response time based on the identity of the content exchange and a history of content presentation bid cycles completed by the content presentation bid application server with the identified content exchange, where the response time is a time between receiving the content presentation bid request and a time when the content presentation bid application server returns a response to the content presentation bid request to the identified content exchange. At block 206, the content presentation bid application server retrieves enrichment data associated with the UE from a database, where the enrichment data comprises two or more of demographics about a user associated with the UE, information about the most recent time an application was launched on the UE, information about a recent relocation by more than 200 miles by the UE, identification of a cluster to which a user of the UE is associated, information about an average rate of data consumption by the UE, and information about an average volume of on-line purchases made from the UE. It is understood that data different from those data types identified above may be included in the enrichment data. In an embodiment, the information about a recent relocation may comprise a different threshold, for example a relocation more than 50 miles, more than 100 miles, more than 300 miles, more than 400 miles, or more than 500 miles.

At block 208, the content presentation bid application server transmits the content presentation bid request and the enrichment data to a plurality of demand side platforms, where the demand side platforms are content providers that bid to pay to have content presented on the UE. At block 210, the content presentation bid application server determines a bid request response timeout based on the response time, based on a time consumed in retrieving the enrichment data, and based on an average time consumed by bid selection by the content presentation bid application server. At block 212, the content presentation bid application server receives one or more content presentation bid responses from the demand side platforms.

At block 214, the content presentation bid application server determines that the time between the receipt of the content presentation bid request from the content exchange by the content presentation bid application server to the present time has reached the bid request response timeout. At block 216, responsive to determining that the present time has reached the bid request response timeout, the content presentation bid application server selects one of the content presentation bid responses received from the demand side platforms. At block 218, the content presentation bid application server builds a content presentation bid based on the selected content presentation bid response. At block 220, the content presentation bid application server transmits the selected content presentation bid to the content exchange.

Figure 4:
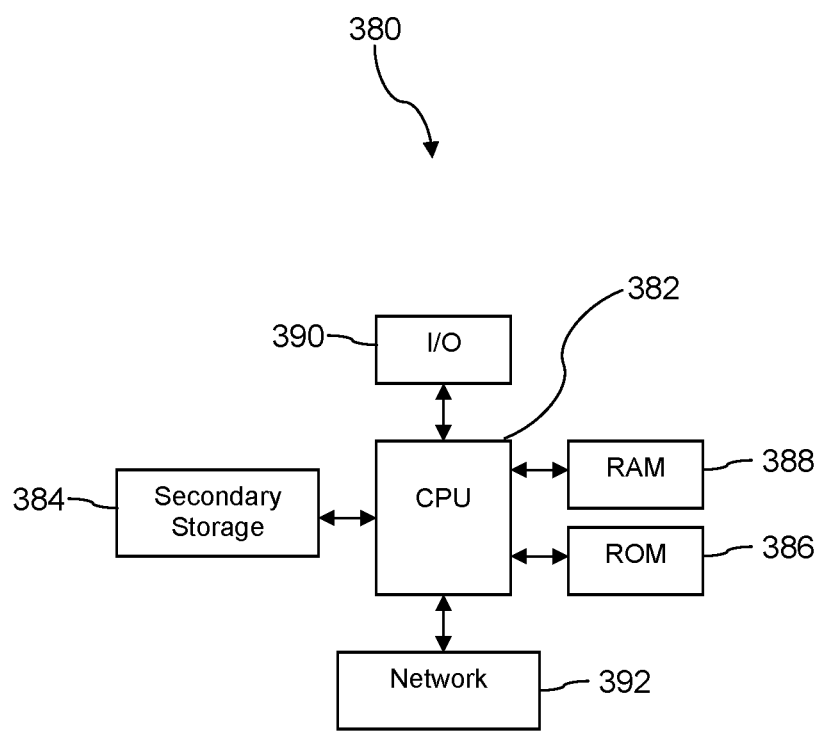
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for mobile content distribution, comprising:
    a load balancer server comprising:
        a load balancer processor,
        a load balancer non-transitory memory, and
        a load balancer application stored in the non-transitory memory that, when executed by the load balancer processor receives content presentation bid requests and transmits each content presentation bid request to one of a plurality of application servers to balance a bid request load across the application servers, wherein the bid requests are requests to bid a price for presenting content on a user equipment (UE) associated with the bid request and comprises an identity of the UE; and
    the plurality of content presentation bid application servers, each comprising
        a content presentation bid processor,
        a content presentation bid non-transitory memory, and
        a content presentation bid application stored in the content presentation bid non-transitory memory that, when executed by the content presentation bid processor,
            determines a content presentation bid application server bid query rate for each of a plurality of demand side platforms based on a predefined total bid query rate for each demand side platform and based on a predefined number of content presentation bid application servers that are active,
            receives content presentation bid requests from the load balancer server,
            looks up enrichment data stored in a data store based on the UE identity in the content presentation bid requests,
            transmits content presentation bid requests supplemented with enrichment data to the demand side platforms based at least in part on the content presentation bid application server bid query rate determined by the content presentation bid application,
            receives one or more content presentation bid responses from the demand side platforms,
            selects a content presentation bid response from among the one or more content presentation bids responses,
            based on the selected content presentation bid response, builds a content presentation bid, and
            transmits the content presentation bid.

2. The system of claim 1, wherein content presentation bid application servers are disjointed, non-clustered servers.

3. The system of claim 1, wherein the load balancer application receives content presentation bid requests from a plurality of content exchanges, where each content exchange provides content dynamically to UEs and the content presentation bid request comprises an identity of the content exchange from which the content presentation bid request is received.

4. The system of claim 1, wherein the enrichment data comprises two or more of demographics about a user associated with the UE, information about the most recent time an application was launched on the UE, information about a recent relocation by more than 200 miles by the UE, identification of a cluster to which a user of the UE is associated, information about an average rate of data consumption by the UE, and information about an average volume of on-line purchases made from the UE.

5. The system of claim 1, wherein the content presentation bid application, when executed by the content presentation bid processor, further receives content presentation bid opportunity criteria from the demand side platforms, filters the content presentation bid requests based on the content presentation bid opportunity criteria, and transmits the filtered content presentation bid requests supplemented with enrichment data to demand side platforms.

6. The system of claim 1, wherein each of the plurality of content presentation bid application servers establishes a persistent event-driven input-output (I/O) communication link with each of the demand side platforms.

7. The system of claim 1, wherein the content presentation bid transmitted by the content presentation bid application is a bid to present advertisement on the UE and comprises advertisement content.

8. A content presentation bid application server, comprising:
   a processor;
   a non-transitory memory, and
   a content presentation bid application stored in the non-transitory memory that, when executed by the processor,
      determines a content presentation bid application server bid query rate for each of a plurality of demand side platforms based on a predefined total bid query rate for each demand side platform and based on a predefined number of content presentation bid application servers that are active,
      receives a content presentation bid request, wherein the content presentation bid request comprises an identity of a user equipment (UE),
      retrieves enrichment data associated with the UE from a database, where the enrichment data comprises two or more of demographics about a user associated with the UE, information about the most recent time an application was launched on the UE, information about a recent relocation by more than 200 miles by the UE, identification of a cluster to which a user of the UE is associated, information about an average rate of data consumption by the UE, and information about an average volume of on-line purchases made from the UE,
      determines a bid request response timeout based on a history of content presentation bid cycles completed by the content presentation bid application,
      transmits the content presentation bid request accompanied by the enrichment data to one or more demand side platforms of the plurality of demand side platforms based at least in part on the content presentation bid application server bid query rate determined by the content presentation bid application, wherein the demand side platforms are content providers that bid to pay to have content presented on the UE,
      receives one or more content presentation bid responses from the demand side platforms,
      determines that the time between the receipt of the content presentation bid request by the content presentation bid application to the present time has reached the bid request response timeout,
      responsive to determining that the present time has reached the bid request response timeout, selects one of the content presentation bid responses received from the demand side platforms,
      based on the selected content presentation bid response builds a content presentation bid, and
      transmits the content presentation bid.

9. The server of claim 8, wherein the enrichment data comprises information about when a browser of the UE was last launched, whereby the demand side platforms assess a receptivity of a user of the UE to their presentation content.

10. The server of claim 8, wherein the content presentation bid request further comprises an identity of a specific application on the UE in which content is to be presented and wherein the enrichment data comprises information about when the identified application was last launched on the UE, whereby the demand side platforms assess a receptivity of a user of the UE to their presentation content.

11. The server of claim 8, wherein the content presentation bid application server maintains a pool of open communication links with each of the demand side platforms and wherein the transmitting the content presentation bid request to the demand side platforms and the receiving of content presentation bid responses from the demand side platforms is via asynchronous communication over the open communication links.

12. The server of claim 8, wherein the content presentation bid application receives content presentation bid requests from a plurality of content exchanges, where each content exchange provides content dynamically to UEs, the content presentation bid request further comprises an identity of one of the content exchanges, and the content presentation bid application determines the response time timeout further based on a history of content presentation bid cycles completed by the content presentation bid application server with the identified content exchange.

13. The server of claim 8, wherein the UE is one of a mobile telecommunications device, a smart phone, a personal digital assistant (PDA), a media player, a wearable computer, a headset computer, a laptop computer, a notebook computer, a tablet computer, or a desktop computer.

14. The server of claim 8, wherein the content presentation bid request further comprises information about one of the UE or a user of the UE.

15. A method for mobile content distribution, comprising:
   determining a content presentation bid application server bid query rate for each of a plurality of demand side platforms based on a predefined total bid query rate for each demand side platform and based on a predefined number of content presentation bid application servers that are active;
   receiving a content presentation bid request by a content presentation bid application server from one of a plurality of content exchanges, where each content exchange provides content dynamically to user equipments (UEs) and the content presentation bid request comprises an identity of a UE and an identity of the content exchange;
   determining a response time by the content presentation bid application server based on the identity of the content exchange and a history of content presentation bid cycles completed by the content presentation bid application server with the identified content exchange, where the response time is a time between receiving the content presentation bid request and a time when the content presentation bid application server returns a response to the content presentation bid request to the identified content exchange;
   retrieving enrichment data associated with the UE from a database by the content presentation bid application server, where the enrichment data comprises two or more of demographics about a user associated with the UE, information about the most recent time an application was launched on the UE, information about a recent relocation by more than 200 miles by the UE, identification of a cluster to which a user of the UE is associated, information about an average rate of data consumption by the UE, and information about an average volume of on-line purchases made from the UE;
   transmitting the content presentation bid request and the enrichment data by the content presentation bid application server to the plurality of demand side platforms based at least in part on the content presentation bid application server bid query rate determined by the content presentation bid application, where the demand side platforms are content providers that bid to pay to have content presented on the UE;

determining a bid request response timeout by the content presentation bid application server based on the response time, based on a time consumed in retrieving the enrichment data, and based on an average time consumed by bid selection by the content presentation bid application server;

receiving one or more content presentation bid responses by the content presentation bid application server from the demand side platforms;

determining by the content presentation bid application server that the time between the receipt of the content presentation bid request from the content exchange by the content presentation bid application server to the present time has reached the bid request response timeout;

responsive to determining that the present time has reached the bid request response timeout, selecting by the content presentation bid application server one of the content presentation bid responses received from the demand side platforms;

building a content presentation bid by the content presentation bid application server based on the selected content presentation bid response; and transmitting the selected content presentation bid by the content presentation bid application server to the content exchange.

16. The method of claim 15, wherein the content presentation bid request further comprises information about one of the UE or a user of the UE and further comprising transmitting the information about the UE or user of the UE as additional enrichment data to the database.

17. The method of claim 15, further comprising appraising a value of the enrichment data by the content presentation bid application server, wherein building the content presentation bid comprises setting a bid price based on the appraised value of the enrichment data.

18. The method of claim 15, wherein the content is advertising content.

19. The method of claim 15, wherein the UE is one of a mobile telecommunications device, a smart phone, a personal digital assistant (PDA), a media player, a wearable computer, a headset computer, a laptop computer, a notebook computer, a tablet computer, or a desktop computer.

20. The method of claim 15, wherein the response time is less than 500 mS.

* * * * *